US010649686B2

(12) United States Patent
Tsirkin

(10) Patent No.: US 10,649,686 B2
(45) Date of Patent: May 12, 2020

(54) MEMORY CACHE PRESSURE REDUCTION FOR POINTER RINGS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 24 days.

(21) Appl. No.: 15/984,961

(22) Filed: May 21, 2018

(65) Prior Publication Data
US 2019/0354310 A1 Nov. 21, 2019

(51) Int. Cl.
*G06F 3/06* (2006.01)
*G06F 12/0802* (2016.01)

(52) U.S. Cl.
CPC .......... *G06F 3/0656* (2013.01); *G06F 3/0604* (2013.01); *G06F 3/065* (2013.01); *G06F 3/0664* (2013.01); *G06F 3/0683* (2013.01); *G06F 12/0802* (2013.01); *G06F 2212/60* (2013.01)

(58) Field of Classification Search
CPC ....... G06F 9/45558; G06F 2009/45583; G06F 9/544; G06F 2212/621; G06F 12/0808; G06F 2009/45595; G06F 12/0868; G06F 2212/224; G06F 2212/60; G06F 12/0802; G06F 3/0656; G06F 3/065; G06F 3/0604; G06F 3/0664; G06F 3/0683
USPC .......................................................... 711/159
See application file for complete search history.

(56) References Cited

U.S. PATENT DOCUMENTS

| 9,246,836 B2 | 1/2016 | Biswas | |
| 2007/0094478 A1* | 4/2007 | Plondke | .................... G06F 5/10 711/219 |
| 2014/0064291 A1* | 3/2014 | Biswas | ................. H04L 47/624 370/412 |
| 2014/0075144 A1* | 3/2014 | Sanders | .................. G06F 12/02 711/170 |

OTHER PUBLICATIONS

Massimo Torquati; Single-Producer/ Single-Consumer Queues on Shared Cache Multi-Core Systems; Computer Science Department; University of Pisa, Italy; arXiv:1012.1824v1 [cs.DS]; Dec. 8, 2010; (19 pages).
Javin Paul; Java Lock and Condition Example using Producer Consumer Solution; http://javarevisited.blogspot.in/2015/06/java-lock-and-condition-example-producer-consumer.html; Jun. 19, 2017; retrieved on Apr. 2, 2018; (8 pages).

* cited by examiner

*Primary Examiner* — Hashem Farrokh
(74) *Attorney, Agent, or Firm* — K&L Gates LLP

(57) ABSTRACT

A system includes a memory with a ring buffer having a plurality of slots and a producer and consumer processor in communication with the memory. The producer processor is configured to receive a new memory entry and detect a failure to produce the new memory entry to a slot in the ring buffer. Each memory entry in the ring buffer has an entry structure to maintain a list of extra entries. The producer processor is also configured to determine a location of an entry pointer for a last produced memory entry in the ring and add the new entry to the list of extra entries in the respective slot in the ring. Responsive to consuming the last produced memory entry, the consumer processor is configured to check whether the last produced memory entry includes any other memory entries in the list of extra entries and consume the new memory entry.

20 Claims, 11 Drawing Sheets

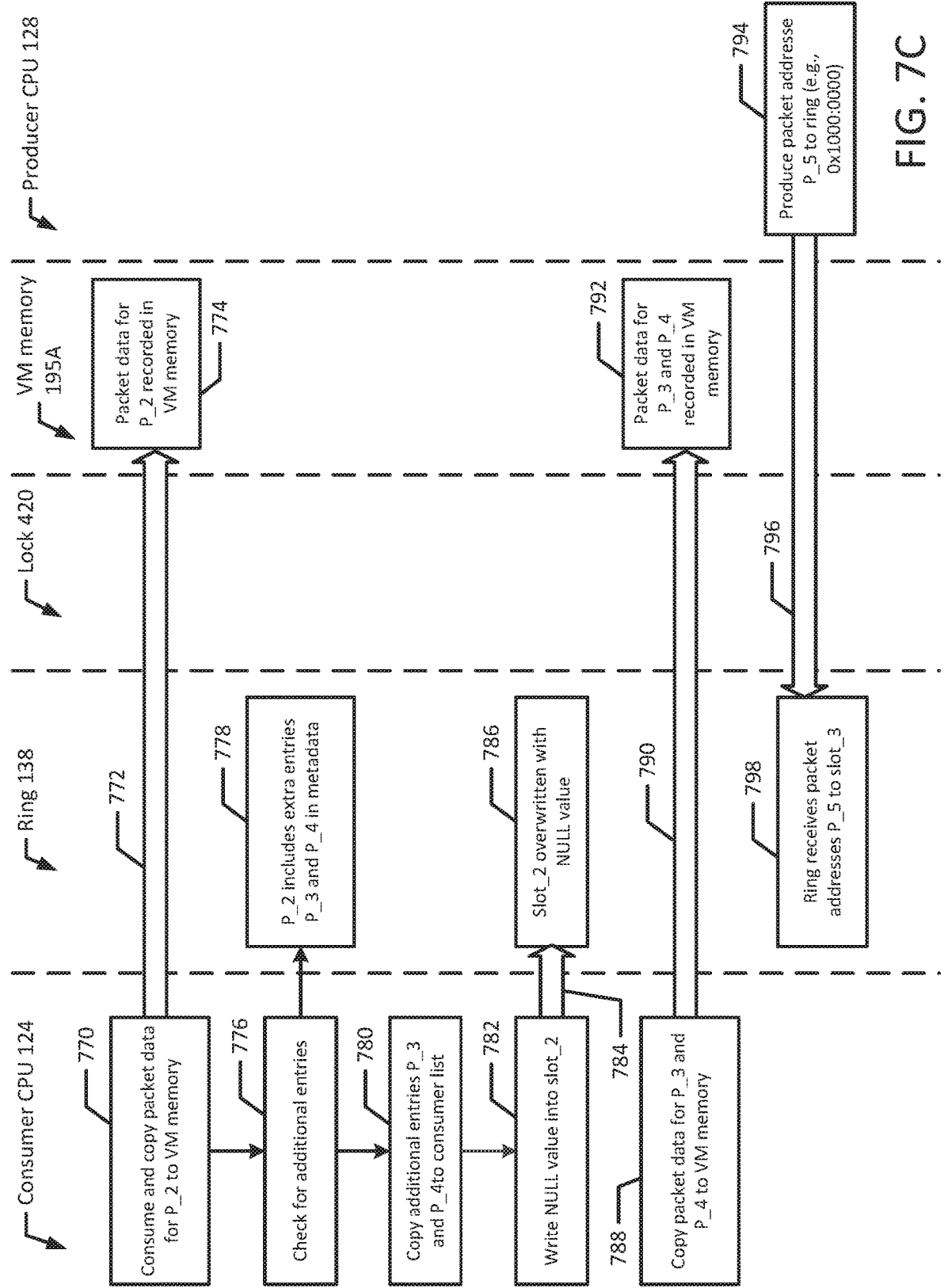

MEMORY CACHE PRESSURE REDUCTION FOR POINTER RINGS

BACKGROUND

Computer systems may routinely copy memory entries from one memory to a different memory. For example, while forwarding incoming networking traffic to a physical or virtual machine, packets may be received and later copied to another memory location. Processors may execute instructions to read, write, and copy memory entries, such as packet addresses to forward networking traffic to different machines. For example, memory entries may be temporarily stored in ring buffers on a first-in-first-out basis before being copied to the memory associated with a different machine. Specifically, incoming networking traffic may be stored on a ring buffer and later copied to virtual machine memory.

SUMMARY

The present disclosure provides new and innovative systems and methods for memory cache pressure reduction for pointer rings (e.g., ring buffers storing entry pointers). In an example, a system includes a memory and at least one processor in communication with the memory. The memory includes a ring buffer having a plurality of slots. The at least on processor includes a producer processor and a consumer processor. The producer processor is configured to receive a new memory entry and detect a failure to produce the new memory entry to a slot in the ring buffer. Each memory entry in the ring buffer has an entry structure to maintain a list of extra entries. The producer processor is also configured to determine a location of an entry pointer for a last produced memory entry in the ring buffer and add the new memory entry to the list of extra entries in the respective slot associated with the last produced memory entry in the ring buffer. Responsive to consuming the last produced memory entry, the consumer processor is configured to check whether the last produced memory entry includes any other memory entries in the list of extra entries. Additionally, the consumer processor is configured to consume the new memory entry.

In an example, a method includes receiving, by a producer processor, a new memory entry and detecting a failure to produce the new memory entry to a slot in a ring buffer. Each memory entry in the ring buffer has an entry structure to maintain a list of extra entries. The method also includes determining, by the producer processor, a location of an entry pointer for a last produced memory entry in the ring buffer and adding the new memory entry to the list of extra entries in the respective slot associated with the last produced memory entry in the ring buffer. Additionally, the method includes responsive to consuming the last produced memory entry, checking, by a consumer processor, whether the last produced memory entry includes any other memory entries in the list of extra entries and consuming the new memory entry.

In an example, a method includes receiving, by a producer processor, at least one new memory entry and acquiring a lock. Responsive to acquiring the lock, the producer processor accesses a respective slot in a ring buffer. The method also includes detecting, by the producer processor, a failure to produce the at least one new memory entry to the respective slot in a ring buffer having a plurality of slots. Each memory entry in the ring buffer has an entry structure to maintain a list of extra entries. The method also includes determining, by the producer processor, a location of an entry pointer for a last produced memory entry in the ring buffer and adding the at least one new memory entry to the list of extra entries in the respective slot associated with the last produced memory entry in the ring buffer. Additionally, the method includes releasing the lock.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIGS. 7A, 7B and 7C illustrate a flow diagram of an example process for memory cache pressure reduction for pointer rings according to an example embodiment of the present disclosure.

DETAILED DESCRIPTION OF EXAMPLE EMBODIMENTS

Figure 1:
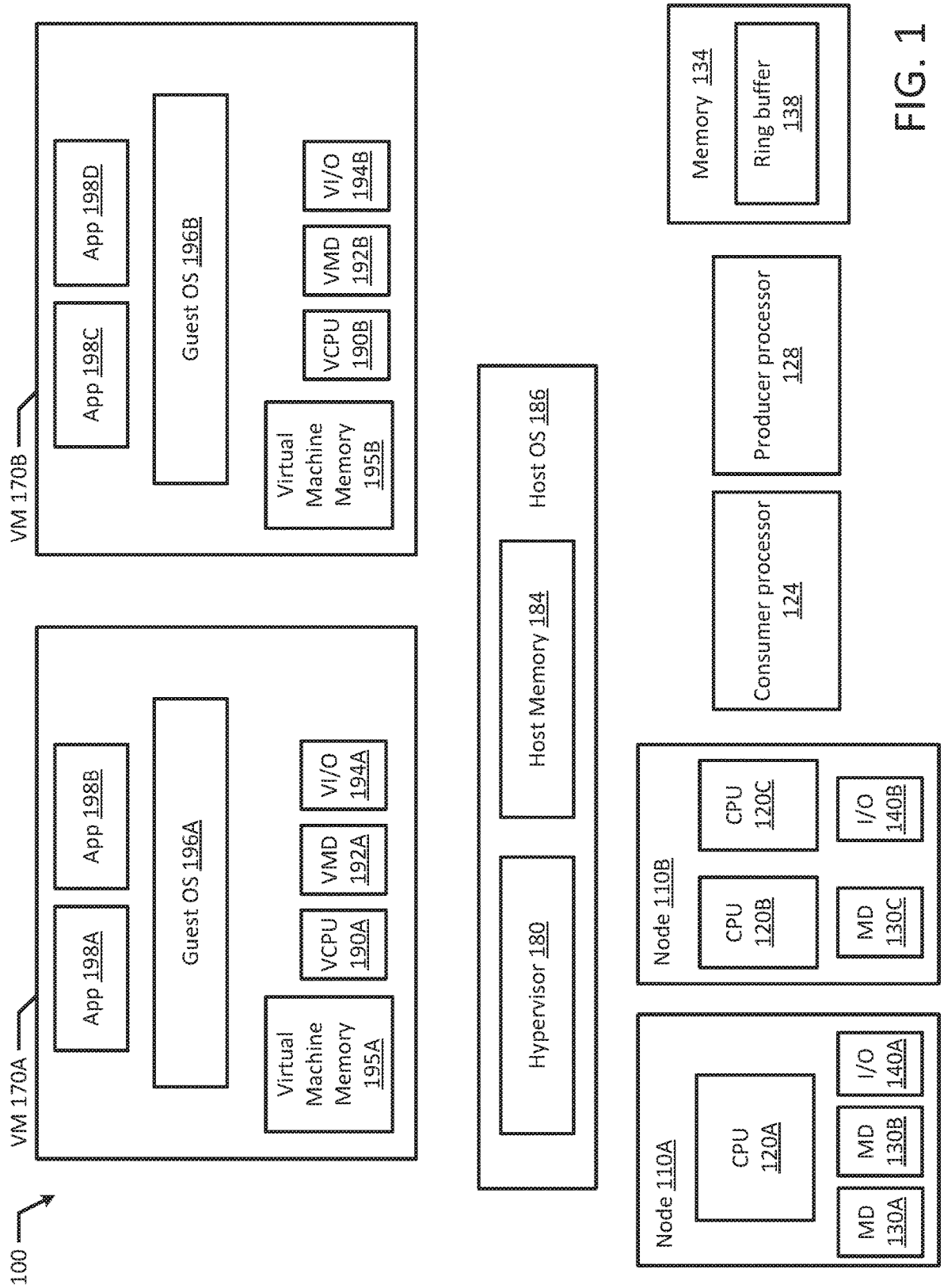
FIG. 1 illustrates a block diagram of an example computing system according to an example embodiment of the present disclosure.

Techniques are disclosed for memory cache pressure reduction for pointer rings (e.g., ring buffers storing entry pointers) when copying data from one memory location (e.g., ring buffer) to a different memory. For example, the techniques disclosed may be used when forwarding incoming network traffic to a virtual machine by a hypervisor, which may include receiving a packet from a network interface controller (NIC) in hypervisor memory and recording or copying the packet into virtual machine memory. Virtualization allows a host machine to run multiple virtual environments, for example using a hypervisor (e.g., Kernel-based Virtual Machine (KVM)) on an operating system, such as Red Hat® Enterprise Linux® (RHEL). When handling network traffic, hypervisor vendors and operating system (OS) vendors often attempt to improve networking speed for hypervisors for us in networking stacks. An example vendor is Red Hat, which offers RHEL.

The act of receiving the data (e.g., packets) and copying the data may be executed on the same processor (e.g., CPU), however, parallelizing the actions on separate processors or separate processor cores may provide significant performance advantages. Currently, techniques of parallelizing the receiving and copying may involve a first CPU receiving an interrupt from a NIC, receiving packets from the NIC, and adding the packets to a list in a shared memory. A second CPU runs a thread to retrieve the packets from the list and record copy the packets into virtual machine (VM) memory. Because the parallel process utilizes two CPUs, the process adds additional overhead since adding and removing packets on one list requires cross-CPU communication through shared memory. Traditionally, a linked list or a producer/consumer ring was used without much added performance as false cache sharing typically outweighed the benefits of parallelism.

Additionally, other approaches such as a typical circular buffer design often creates cache line bounces between the two CPUs. For example, a ring data structure (e.g., an array with a plurality of slots) may be used with a producer processor and a consumer processor (or producer CPU and consumer CPU). In the disclosed implementation, an interrupt handling processor or producer processor may maintain a producer pointer. The producer pointer may store data, such as the address of each packet received at the slot addressed by the producer pointer. The producer processor may increment the pointer to address the next slot, thereby wrapping around at the end of the array. To avoid overruns, before storing the data (e.g., the address of each packet and/or packet), the producer processor may test the value in each slot. If the value is valid (e.g., not NULL or non-NULL), the data is not stored in the list and may be discarded. A data copying processor or consumer processor may maintain a consumer pointer. The consumer processor may test the value pointed to by the consumer pointer. If the value is invalid (e.g., NULL), then the array is empty and the consumer processor may stop and wait for more packets. If the value is valid (e.g., not NULL or non-NULL), the consumer processor may retrieve the data, such as a packet address. Then, the consumer processor may invalidate the slot (e.g., write or store NULL value into the slot) and may advance the consumer pointer to the next slot. The retrieved data may be copied to a second memory location (e.g., virtual machine memory).

Invalidating a slot (e.g., storing a NULL value in a slot) advantageously allows reuse of the slot for additional data (e.g., forwarding a new packet). However, this data structure may experience performance bottlenecks. Even when a ring is close to empty, the pointer ring uses more memory than an empty linked list. In particular, even when only a small number of packets are in flight at a time (e.g., produced and/or consumed from the ring), both the consumer processor and producer processor walk the entire ring, which puts pressure on the CPU's memory cache. This pressure is especially noticeable when the consumer processor and the producer processor execute on the same physical CPU (e.g., using hyper-threading).

For example, when a driver is highly optimized, copying or recording may be slower than receiving packets. Thus, the ring may be full for a large part of the time, and as a result, as each packet slot is invalidated by the consumer processor, the packet slot is immediately made valid again by the interrupt handling processor or producer processor, which causes a cache line to bounce between the processors and results in a significant slowdown. Due to the bottleneck and resulting slowdown, the consumer processor may be typically unable to get ahead of the producer processor resulting in cache line bounces for each data operation in the ring buffer.

A proposed solution to the cache line bounces described above was to reserve extra slots in the ring, which would remain unused to space out the producer thread and consumer thread such that they were not accessing the same cache line. However, ring size is often designed in powers of two to allow optimization. If a ring with 128 active slots is needed, then by adding unused slots, the implemented ring would be designed with 256 slots (e.g., next power of two above 128 slots). For example, if 128 active slots will be utilized, and 10 slots will remain unused, then the ring needs a minimum of 138 slots. Due to the common practice of increasing ring buffer size by a factor of two, the next logical ring buffer size is 256 slots (e.g., next largest size up from 128 slots). However, larger rings are problematic because the processors keep watch over the ring, and a larger ring puts more pressure on cache. Moreover, only actively using, for example, 128 slots of 256 slots is not an efficient use of hardware resources.

As described in the various example embodiments disclosed herein, to reduce pressure placed on cache by pointer rings, an entry pointer data structure may be augmented to include an additional field to maintain a list of extra entries. When a ring is full, additional packet information may be added to the list of extra entries, which can be consumed by a consumer processor. Instead of having to enlarge the ring buffer, which is computationally expensive, packet information may be stored in existing ring entries for consumption rather than discarded. For example, the producer processor may detect a failure to produce a new memory entry to a ring buffer (e.g., failure because ring buffer is full) and may determine a location of an entry pointer for the last produced memory entry in the ring buffer. Then, the producer processor may add the new memory entry to the list of extra entries in the respective slot associated with the last produced memory entry. Specifically, the producer processor may add the new memory entry to the data structure for the last produced entry pointer in the ring buffer.

When the consumer processor consumes that memory entry, the consumer processor checks whether the entry pointer includes other memory entries in its list of extra entries. If the entry pointer includes additional entries in this list, the consumer processor consumes the memory entry and associated entries in the list of extra entries. Thus, cache pressure is reduced as the ring buffer can accommodate additional packets without resizing the ring buffer. Not only is resizing the ring buffer a computationally expensive process, but resizing a ring buffer cannot be done on the fly and often times results in a ring buffer that does not match current system demand. When resizing a ring, memory is allocated for the new ring buffer and the current entries in the ring buffer are typically copied to the newly created ring buffer while both consumer and producer processors are halted or locked out from processing memory entries. For example, by the time a ring buffer is resized, the resized ring buffer may still be too small for current demand or demand may have decreased and the new ring buffer is too large, which wastes space and adds additional pressure to memory cache.

Due to the uncertainty of future ring buffer size requirements and the time it takes to copy memory entries to a new ring buffer, the ring buffer size is typically overshot to avoid computational expenses associated with yet again resizing the ring buffer to make it larger. Once the ring buffer has been enlarged, it may be difficult to resize the ring buffer to make it smaller because such a resizing process typically involves halting or locking out the consumer processor and/or the producer processor to determine the amount of unused slots in the ring.

Instead of using an oversized ring buffer to compensate for periods of high network traffic or using an undersized ring buffer that drops packets, the entry pointer data structure is augmented to handle additional entries, such as a linked list, which can be consumed by the consumer processor in a similar fashion as a typical ring entry. The augmented data structure and presently disclosed methods advantageously allow the system to use a less computationally expensive memory ring buffer that places less pressure on cache while avoiding dropped packets when the ring buffer is full, thereby improving performance and throughput without doubling the ring size as described above.

FIG. 1 depicts a high-level component diagram of an example computing system 100 in accordance with one or more aspects of the present disclosure. The computing system 100 may include an operating system (e.g., host OS 186), one or more virtual machines (VM 170A-B), nodes (e.g., nodes 110A-B), a consumer processor 124, a producer processor 128, and memory 134 including a ring buffer 138. Ring buffer 138 may be a data structure using a single, fixed-size buffer as if it were connected end-to-end (e.g., in a ring). In an example, the ring buffer 138 may be a first-in-first-out (FIFO) data structure. For example, memory entries such as packet addresses may be written into and retrieved from the ring buffer 138. Additionally, the ring buffer 138 may have a plurality of slots, which may store memory entries. The slots may be tracked by pointers or indices.

Virtual machines 170A-B may include a guest OS, guest memory, a virtual CPU (VCPU), virtual memory devices (VIVID), and virtual input/output devices (VI/O). For example, virtual machine 170A may include guest OS 196A, guest memory or virtual machine memory 195A, a virtual CPU 190A, a virtual memory devices 192A, and virtual input/output device 194A. Virtual machine memory 195A may include one or more memory pages. Similarly, virtual machine 170B may include guest OS 196B, virtual machine memory 195B, a virtual CPU 190B, a virtual memory devices 192B, and virtual input/output device 194B. Virtual machine memory 195B may include one or more memory pages.

The computing system 100 may also include a hypervisor 180 and host memory 194. Hypervisor 180 may manage host memory 184 for the host operating system 186 as well as memory allocated to the virtual machines 170A-B and guest operating systems 196A-B such as guest memory or virtual machine memory 195A-B provided to guest OS 196A-B. Host memory 184 and virtual machine memory 195A-B may be divided into a plurality of memory pages that are managed by the hypervisor 180. Virtual machine memory 195A-B allocated to the guest OS 196A-B may be mapped from host memory 184 such that when a guest application 198A-D uses or accesses a memory page of virtual machine memory 195A-B, the guest application 198A-D is actually using or accessing host memory 184.

In an example, a virtual machine 170A may execute a guest operating system 196A and run applications 198A-B which may utilize the underlying VCPU 190A, VIVID 192A, and VI/O device 194A. One or more applications 198A-B may be running on a virtual machine 170A under the respective guest operating system 196A. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186A. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186A while applications 198C-D run on another virtual machine 170B are incompatible with the underlying hardware and/or OS 186. In an example embodiment, a device may be implemented as a virtual machine (e.g., virtual machine 170A-B).

The computer system 100 may include one or more nodes 110A-B. Each node 110A-B may in turn include one or more physical processors (e.g., CPU 120A-C) communicatively coupled to memory devices (e.g., MD 130A-C) and input/output devices (e.g., I/O 140A-B). Each node 110A-B may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B.

In an example, consumer processor 124 and producer processor 128 may be one of the other processor(s) illustrated in FIG. 1, such as a CPU (e.g., CPU 120A-C) on node 110A-B. Similarly, ring buffer 138 may be stored in a memory device, and may be one of the other memory(s) illustrated in FIG. 1, such as MD 130A-C on node 110A-B. Additionally, consumer processor 124 and producer processor 128 may be different cores on the same physical processor. The producer processor 128 may be configured to receive a new memory entry and upon detecting a failure to produce the new memory entry to ring buffer 138, the producer processor 128 locates the entry pointer for the last produced memory entry in ring buffer 138. The producer processor 128 is also configured to add the new memory entry to a list of extra entries in the respective slot associated with the last produced memory entry in the ring buffer 138. In an example, the list of extra entries may be a linked list. Additionally, the consumer processor 124 may be configured to retrieve memory entries from the ring buffer 138 and check whether the ring entries include a list of extra entries. The consumer processor 124 is also configured to consume the memory entries in the list of extra entries, for example, by copying the entries to a consumer list and then consuming the entries. By adding new memory entries to a list of extra entries when the ring is full, the producer processor prevents the new memory entry from being dropped while maintaining the same ring buffer size, thereby improving performance and throughput without placing additional pressure on system cache.

As used herein, physical processor or processor 120A-C, 124, and 128 refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-C may be interconnected using a variety of techniques, ranging from a point-to-point processor interconnect, to a system area network, such as an Ethernet-based network. Local connections within each node, including the connections between a processor 120A-C and a memory device 130A-C may be provided by one or more local buses of suitable architecture, for example, peripheral component interconnect (PCI).

Figure 2A:
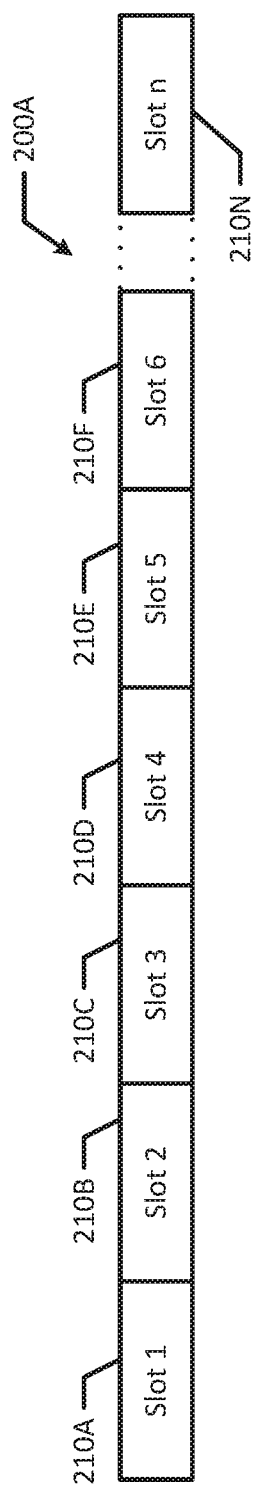
FIG. 2A illustrates a block diagram of an example memory ring according to an example embodiment of the present disclosure.
Figure 2B:
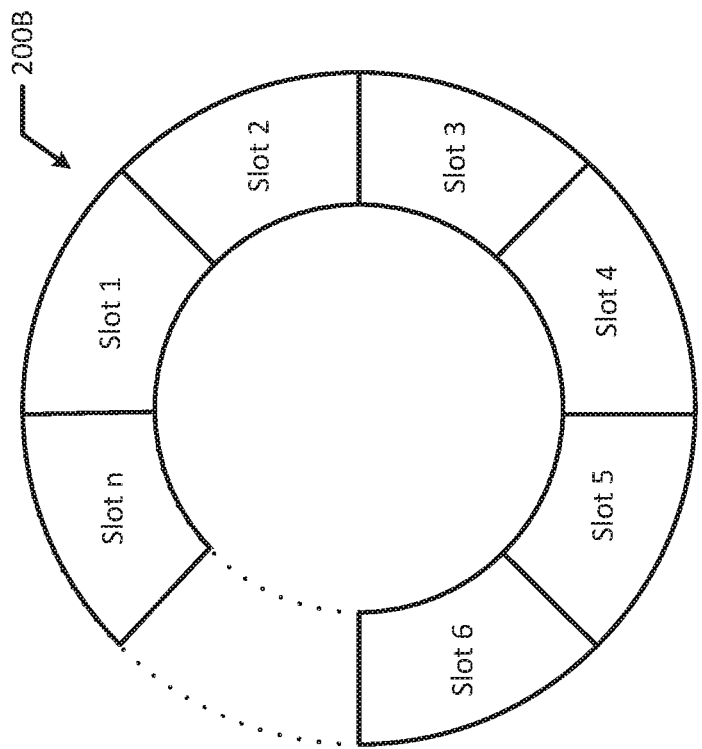
FIG. 2B illustrates a block diagram of an example memory ring according to an example embodiment of the present disclosure.

FIGS. 2A and 2B illustrate block diagrams of example ring buffers 200A and 200B. For example, FIG. 2A illustrates a linear buffer implementation of ring buffer 200A while FIG. 2B illustrates the "ring" structure of ring buffer 200B. It should be appreciated that ring buffers 200A-B may be the same actual memory structure illustrated in two different ways. Ring buffers 200A-B may in be located in cacheable memory, such as L1 cache if on the same physical processor but on different CPU cores. In another example, the ring buffer 200A-B may be on a different level of cache other than L1. Additionally, ring buffers 200A-B may include a plurality of slots (e.g., slots 210A-N). For example, slots 210A-N may correspond to Slot_1 to Slot_n respectively. Each slot may include a memory entry, such as a data packet, a packet address, an entry pointer, or the like. Additionally, slots may be empty or may include an invalid value, such as "0". For example, a slot with a memory address of "0" or a NULL value may be used to indicate an empty slot or invalid slot. Valid slots may include a memory entry, such as an entry pointer to a data packet or a packet address.

Figure 3:
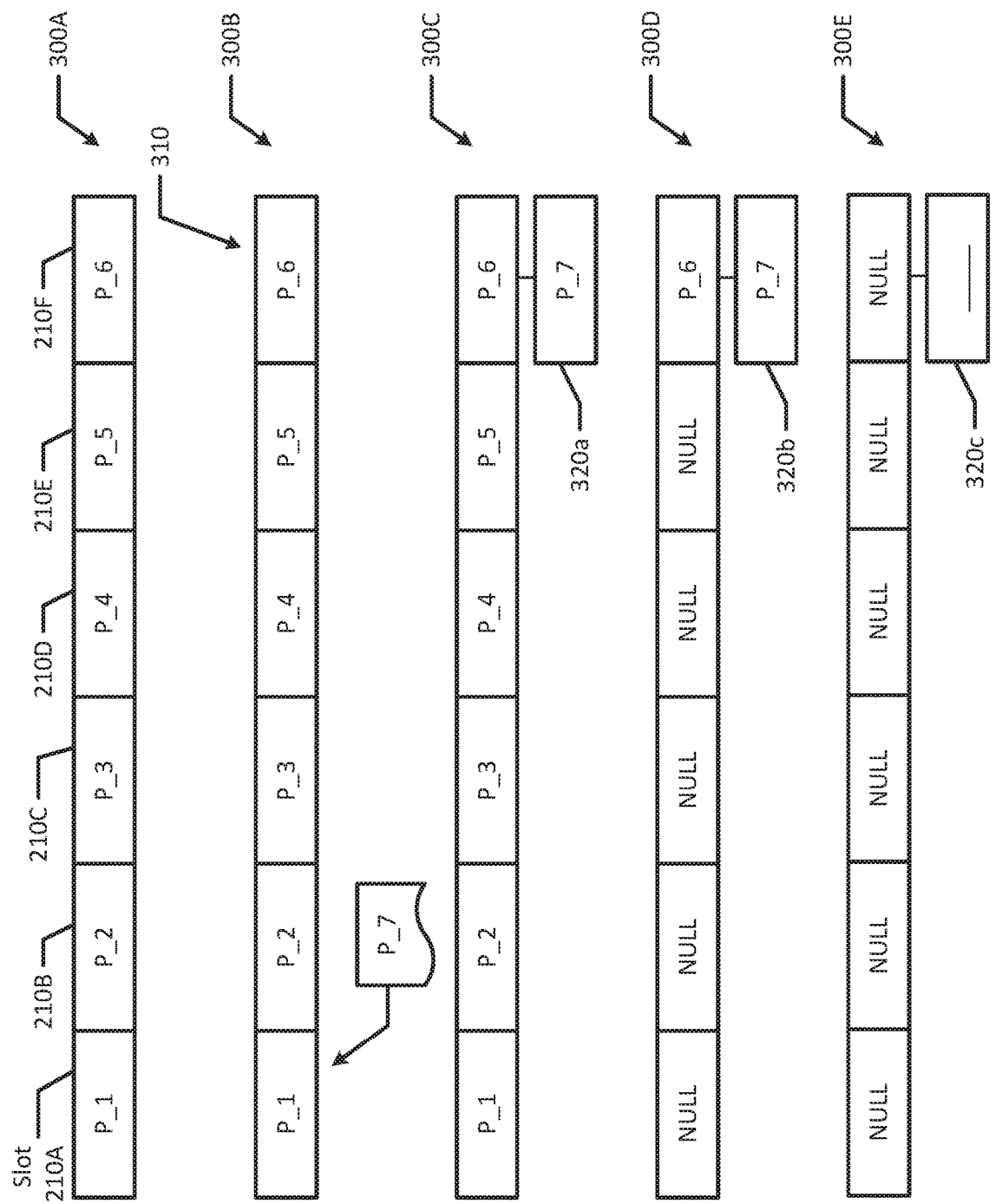
FIG. 3 illustrates a block diagram of memory cache pressure reduction of an example memory ring.

FIG. 3 illustrates a block diagram of memory cache pressure reduction of an example memory ring, such as ring buffer 138 or 200A-B. For example, memory ring or ring buffer 300 is illustrated as 300A-E, which represent different states of memory ring 300 at different points in time. Memory ring or ring buffer 300 may include six slots (e.g., slots 210A-F). In an example, each slot may include a memory entry, such as a packet address P_1 to P_6. As illustrated in ring buffer 300A, a first slot (e.g., slot 210A) includes packet address P_1, slot 210B includes packet address P_2, slot 210C includes packet address P_3, slot 210D includes packet address P_4, slot 210E includes packet address P_5, and slot 210F includes packet address P_6. Packet addresses or entry pointers may be written into the memory ring or ring buffer 300 by a producer processor, such as producer processor 128. A consumer processor may retrieve memory entries, such as packet addresses from a predetermined quantity of slots (e.g., slots 210A-E). After retrieving the packet addresses, the consumer processor 124 may invalidate the slots (e.g., slots 210A-E) associated with the retrieved packet addresses.

As illustrated by ring buffers 300B-D, the producer processor 128 may attempt to add a new packet (e.g., packet P_7) to the ring buffer 300B at slot 210A, which is already occupied by an entry pointer associated with packet P_1. Then, producer processor 128 may locate the entry pointer (e.g., entry pointer for packet P_7) for the last produced memory entry 310 (e.g., P_7) in the ring buffer 300B. As depicted in ring buffer 300C, the producer processor 128 adds the new entry (e.g., P_7) to a list of extra entries 320a associated with the last produced memory entry 310 in the ring buffer 300C. The consumer processor 124 may consume memory entries (e.g., P_1 to P_7) in slots 210A to 210E. After consuming the memory entries (e.g., P_1 to P_7), the consumer processor 124 may invalidate each slot (e.g., slots 210A to 210E) associated with the consumed memory entries (e.g., P_1 to P_7). For example, the consumer processor 124 may invalidate slots 210A to 210E by writing an invalid value (e.g., NULL value) into the respective slots, as illustrated in ring buffer 300D. Then, the consumer processor 124 may consume the memory entries (e.g., P_6 and P_7) associated with slot 210F. For example, the consumer processor 124 may consume the last produced memory entry 310 and check whether the memory entry (e.g., entry pointer for P_6) includes other memory entries in the list of extra entries 320b. The consumer processor 124 may locate the entry for P_7 in the list of extra entries and copy the entry to consumer memory for consumption. After copying entry P_7, the list of extra entries 320c may be cleared as shown in ring buffer 300E. The list of extra entries 320c may be cleared by default when the consumer processor 124 invalidates the slot (e.g., slot 210F) by writing an invalid value (e.g., NULL value) in the slot 210F. Even though FIG. 3 illustrates one extra entry (e.g., P_7) in the list of extra entries, the list may include more than one entry.

In scenarios where the ring buffer 138 typically experiences low network traffic, a smaller ring buffer 138 may be implemented (e.g., a ring buffer 138 with eight slots) may be implemented. The ring buffer 138 may regularly have empty slots, but in some instances of network traffic spikes during high demand, each slot of the ring buffer 138 may fill up thereby eliminating available slots (e.g., empty slots) for the increased network traffic (e.g., an additional 50 packets). An augmented data structure that allows additional entries (e.g., seven additional entries per entry pointer) and presently disclosed methods advantageously allow the ring buffer 138 to accommodate periods of increased network traffic (e.g., 64 packets instead of 8 packets) without increasing the size of the ring buffer 138. In the above example, seven additional entries is used for illustrative purposes only. The quantity of additional entries that the list of extra entries is able to store may depend on the space available in metadata or the additional space added to an augmented data structure. The list of extra entries may accommodate one entry and in other implementations may accommodate multiple entries (e.g., 1, 2, 4, 10, etc.).

For example, a ring buffer 138 with eight slots using an augmented data structure may allow each of the slots to hold seven additional memory entries in a list of extra entries. Thus, when the ring buffer 138 is completely full and each list of extra entries is full, the ring buffer 138 can accommodate 64 memory entries (e.g., one entry per slot plus an additional seven entries associated with each slot) instead of eight entries (e.g., one entry per slot in the ring buffer 138). Specifically, in this example, when the ring buffer 138 is full, the producer processor 128 may add up to seven additional memory entries in the list of extra entries in the last produced entry pointer (e.g., slot_8). If the consumer processor 124 then consumes an entry (e.g., the entry directly in front of the last produced entry or slot_1) and the producer processor 128 produces another memory entry to the recently consumed slot, that memory entry becomes the last produced entry pointer. If the ring buffer 138 remains full, the producer processor 128 may again add up to seven additional memory entries in the list of extra entries in the entry pointer positioned in slot_1 and so on allowing the ring buffer 138 to hold up to 64 memory entries.

Figure 4A:
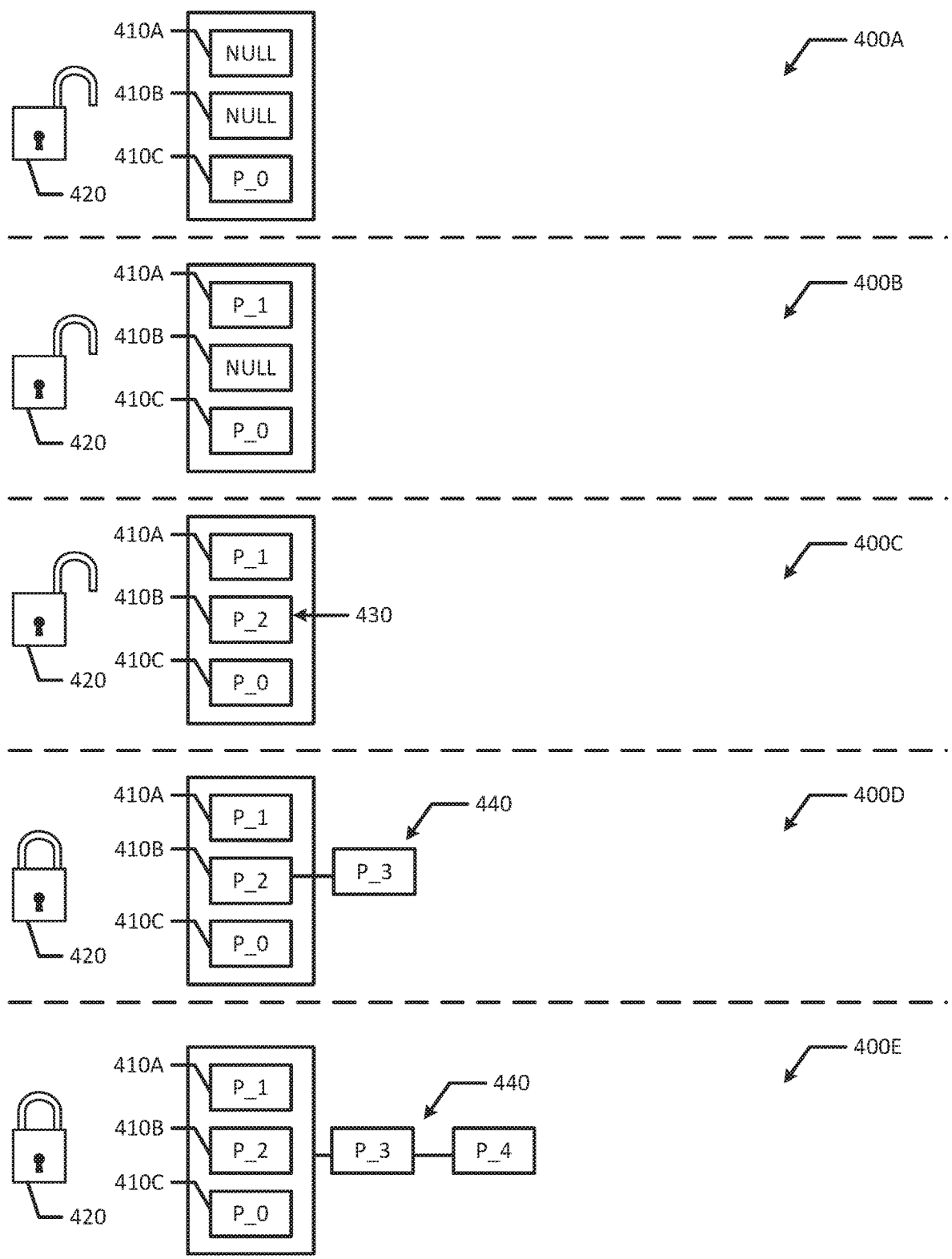
FIGS. 4A and 4B illustrate a block diagram of memory cache pressure reduction of an example memory ring.
Figure 4B:
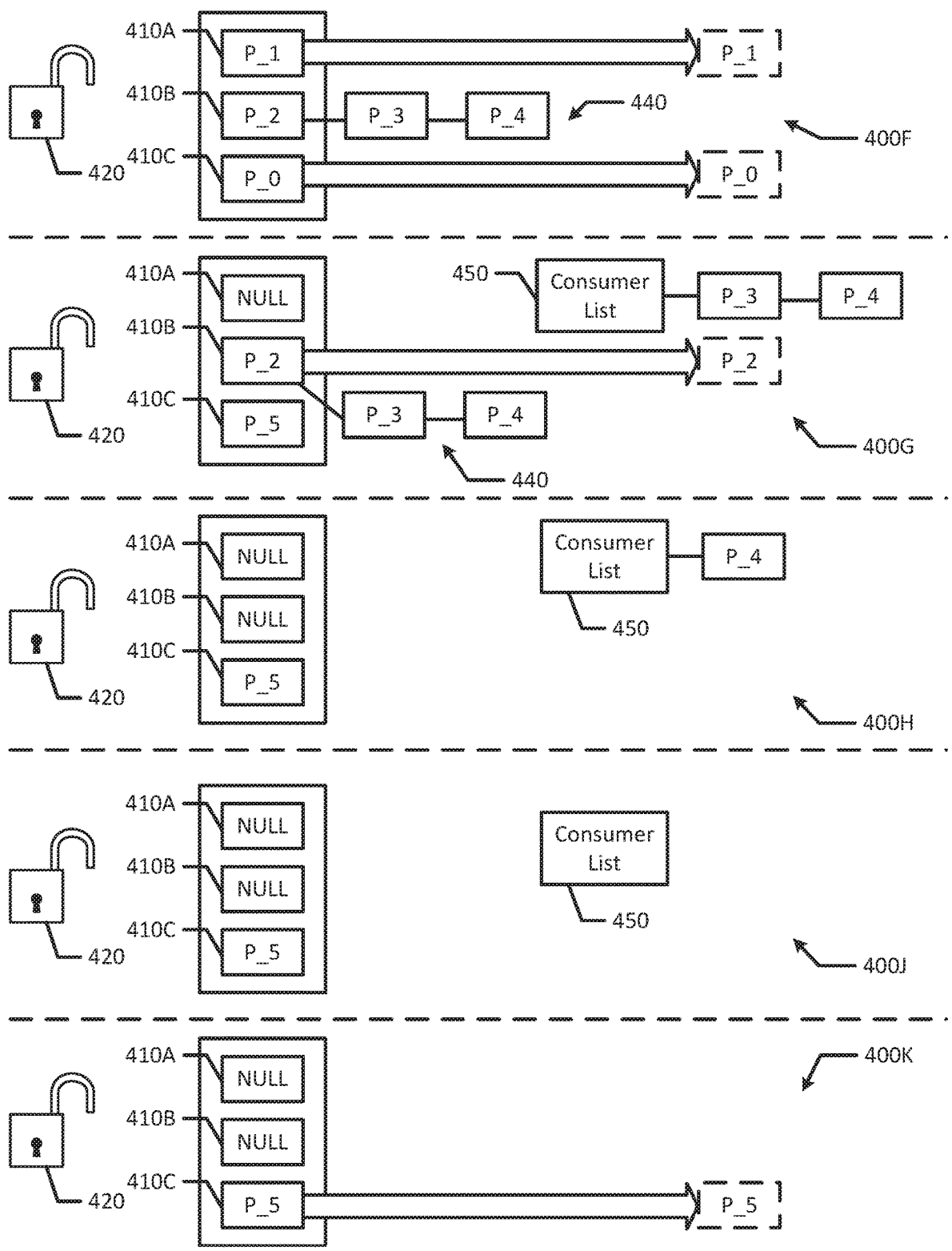

Similar to FIG. 3, FIGS. 4A and 4B illustrate a block diagram of memory cache pressure reduction of an example memory ring, such as ring buffer 138 or 200A-B. For example, memory ring or ring buffer 400 is illustrated as 400A-K, which represent different states of memory ring 400 at different points in time. Memory ring or ring buffer 400 may include three slots (e.g., slots 410A-C). In an example, the third slot (e.g., slot 410C) includes a memory entry for packet address P_0. A lock 420 may be used to govern access to specific slots and/or lists of extra entries. As illustrated in ring buffer 400A, lock 420 is unlocked. The producer processor 128 may receive a new packet with packet address P_1 and may produce the packet to the ring buffer 400B at slot 410A (as shown in ring buffer 400B). Similarly, the producer process 128 may receive another packet with packet address P_2 and may produce the packet to an empty slot (e.g., slot 410B) in the ring buffer 400C. Since the remaining slots are full, entry pointer for packet P_2 is the last produced memory entry 430. At this point, lock 420 has remained unlocked since the producer processor 128 has had empty slots for each memory entry received.

As illustrated by ring 400D, the producer processor 128 receives a new memory entry (e.g., packet P_3), and adds it to a list of extra entries 440 for the last produced memory entry 430 after obtaining lock 420. For example, the producer processor 128 may attempt to produce the new memory entry to a slot in the ring buffer, but each slot in the ring buffer 400D is full and the producer processor 128 may receive a failure message indicating the producer processor 128 failed to produce the new memory entry to a slot in the ring buffer 400D. After receiving the failure, the producer processor 128 may obtain lock 420 and locate the entry pointer for the last produced memory entry 430. After locating the last produced memory entry 430, the producer processor 128 may add the packet P_3 to the list of extra entries 440 as illustrated in ring buffer 400D.

Prior to releasing the lock 420, the producer processor 128 may receive another new memory entry (e.g., packet P_4) and may also add it to the list of extra entries 440 as illustrated in ring buffer 400E. For example, the entry pointer P_2 may include a list of extra entries 440 that includes information for packet P_3 and P_4. Then, the producer processor 128 may release lock 420 and the consumer processor 124 may consume packet P_0 from slot 410C and packet P_1 from slot 410A as shown in ring buffer 400F. After the slots 410C and 410A are consumed, the consumer processor 124 may invalidate the slots 410C and 410A with a NULL value. Now that the ring buffer has empty slots (e.g., invalidated slots), a new memory entry (e.g., packet P_5) received by the producer processor 128 may be produced to one of the empty slots (e.g., slot 410C). The ring now has the new packet P_5 produced to slot 410C and a NULL value in slot 410A as shown in ring buffer 400G. The consumer processor 124 may continue to consume slots (e.g., slots 410B and 410C) and as the consumer processor 124 consumes packet P_2 in slot 410B, the consumer processor 124 also checks whether the memory entry (e.g., entry pointer for packet P_2) includes other memory entries in a list of extra entries 440. As illustrated in ring buffer 400G, the consumer processor 124 locates entries for packets P_3 and P_4 in the list of extra entries 440 and copies them to a consumer list 450 in consumer memory.

At ring buffer 400H, the consumer processor 124 consumes packet P_3 from consumer list 450 and at ring buffer 400J, the consumer processor 124 consumes packet P_4 from consumer list 450. After consuming packet P_4, the consumer list 450 is empty. The consumer processor 124 may proceed to consume the memory entry associated with slot 410C (e.g., packet P_5) as illustrated in ring buffer 400K. As illustrated in FIG. 4B, the consumer processor 124 copies the new memory entries (e.g., packet P_3 and P_4) from the list of extra entries prior to consuming additional entries in the ring buffer (e.g., packet P_5), which preserves an order of memory entries as received by the producer processor 128.

In an example, the consumer processor 124 may consume the memory entries (e.g., P_0 to P_2) in the ring buffer 138, 400 while the producer processor 128 is attempting to locate the last produced memory entry 310. If the producer processor 128 fails to locate the last produced memory entry (e.g., P_2), the ring buffer 138, 400 may be empty and the producer processor 128 may produce the new memory entry (e.g., P_3) to the ring buffer 138, 400 before and/or after releasing lock 420. The producer processor 128 may also compensate for the above scenario by attempting to produce the new memory entry (e.g., P_3) to the ring buffer 138, 400 after acquiring the lock 420, but before determining the location of the last produced memory entry (e.g., P_2). If the producer processor 128 succeeds in producing the new memory entry (e.g., P_3) to a slot (e.g., slot 410C) in the ring buffer 138, 400, then the producer processor 128 may release the lock 420 without looking up the location (e.g., slot 410B) of the last produced memory entry.

Figure 5:
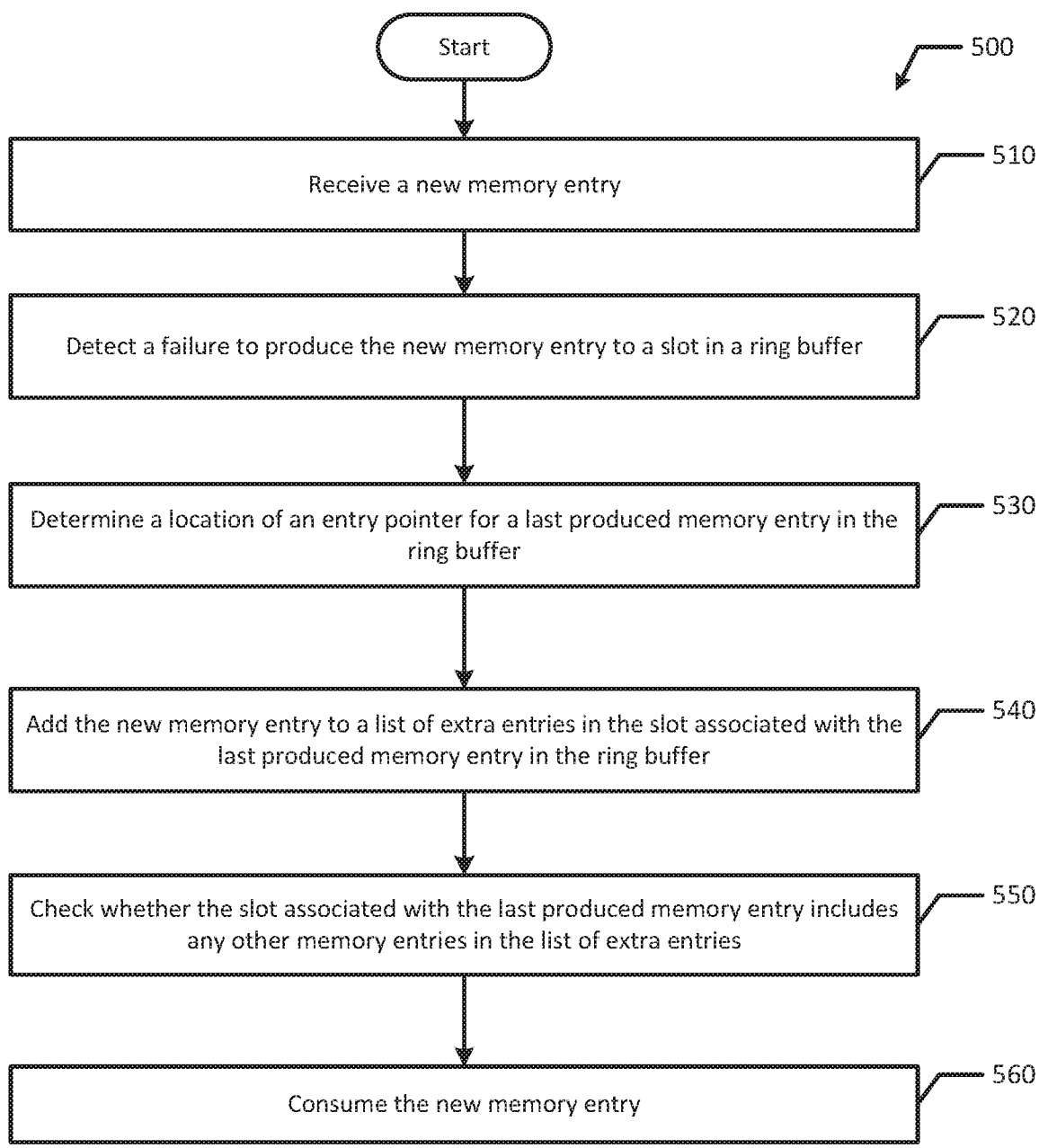
FIG. 5 illustrates a flowchart of an example process for memory cache pressure reduction according to an example embodiment of the present disclosure.

FIG. 5 illustrates a flowchart of an example method 500 for memory cache pressure reduction for pointer rings according to an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

The example method 500 includes receiving a new memory entry (block 510). For example, a producer processor 128 may receive a new memory entry (e.g., P_3). Memory entries, such as data packets may be received one at a time or in batches. The method also includes detecting a failure to produce the new memory entry to a slot in a ring buffer (block 520). For example, the producer processor 128 may detect a failure to produce the new memory entry (e.g., P_3) to a slot (e.g., slot 410B) in the ring buffer (e.g., ring buffer 400). Each memory entry in the ring buffer may have an entry structure to maintain a list of extra entries, for example, in metadata of an entry pointer. For example, the entry structure may include a memory address and metadata, which has free space to store the list of extra entries. Additionally, the method includes determining a location of an entry pointer for a last produced memory entry in the ring buffer (block 530). For example, the producer processor 128 may determine a location (e.g., slot 410B) for an entry pointer (e.g., entry pointer for packet P_2) for a last produced memory entry (e.g., P_2) in the ring buffer (e.g., ring buffer 400). The last produced memory entry (e.g., P_2) may be the most recent slot (e.g., slot 410B) filled by the producer processor 128.

Next, the method includes adding the new memory entry to a list of extra entries in the slot associated with the last produced memory entry in the ring buffer (block 540). For example, the producer processor 128 may add the new memory entry (e.g., P_3) to the list of extra entries (e.g., .list 440) in the respective slot (e.g., slot 410B) associated with the last produced memory entry (e.g., P_2) in the ring buffer (e.g., ring buffer 400). Then, the method continues with checking whether the slot associated with the last produced memory entry includes any other memory entries in the list of extra entries (block 550). For example, responsive to consuming the last produced memory entry (e.g., P_2), a consumer processor 124 may check whether the last produced memory entry (e.g., P_2) includes any other memory entries (e.g., P_3 and P_4) in the list of extra entries (e.g., list 440). The method also includes consuming the new memory entry (block 560). For example, the consumer processor 124 may consume the new memory entry (e.g., P_3). Consuming memory entries (e.g., P_3 and/or P_4) may include retrieving the memory entries (e.g., P_3 and/or P_4) and copying the memory entries (e.g., packets P_3 and/or P_4) to a specified location, such as virtual machine memory (e.g., virtual machine memory 195A-B).

In an example, the consumer processor 124 is configured to preserve and order of memory entries (e.g., P_0 to P_5) as received and/or produced by the producer processor 128. As illustrated in FIGS. 4A and 4B, the consumer processor 124 may consume memory entries in the following order—P_0, P_1, P_2, P_3, P_4 and then P_5. For example, the consumer processor 124 may consume memory entries (e.g., P_0 to P_5) in the order they are received such that slots (e.g., slots 410A-C) in the ring buffer (e.g., ring buffer 400) are consumed in order and memory entries (e.g., P_3 and P_4) in a list of extra entries (e.g., list 440) are also consumed in the order they are added.

Figure 6:
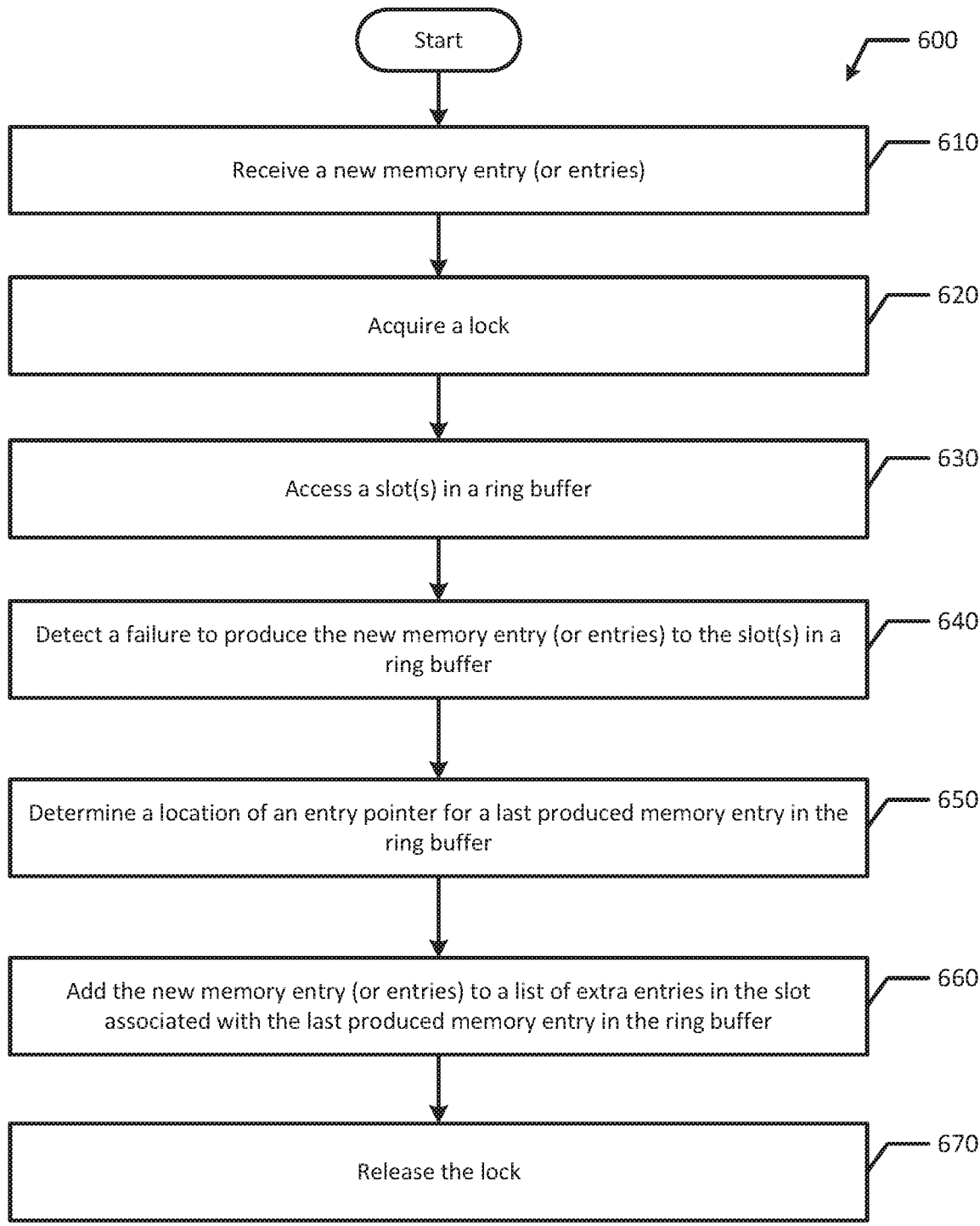
FIG. 6 illustrates a flowchart of an example process for memory cache pressure reduction according to an example embodiment of the present disclosure.

FIG. 6 illustrates a flowchart of an example method 600 for memory cache pressure reduction for pointer rings according to an example embodiment of the present disclosure. Although the example method 600 is described with reference to the flowchart illustrated in FIG. 6, it will be appreciated that many other methods of performing the acts associated with the method 600 may be used. For example, the order of some of the blocks may be changed, certain blocks may be combined with other blocks, and some of the blocks described are optional. The method 600 may be performed by processing logic that may comprise hardware (circuitry, dedicated logic, etc.), software, or a combination of both.

The example method 600 includes receiving a new memory entry (or entries) (block 610). For example, a producer processor 124 may receive at least one new memory entry (e.g., P_7). The method also includes acquiring a lock (block 620). For example, the producer processor 124 may acquire a lock 420. In an example, the lock 420 may be a global lock that controls access of the entire ring buffer 138, 300. In another example, the lock 420 may be a local lock associated with a specific slot (e.g., slot 210F) in the ring buffer 138, 300 or a specific pointer entry (e.g., entry pointer for packet P_6). Specifically, the local lock may be associated with a location of the entry pointer (e.g., slot 210F) for the last produced memory entry (e.g., P_6). Additionally, the lock may control access to the list of extra entries (e.g., list 320), such as metadata in the entry pointer. The lock 420 may also prevent any consumer processors 124 from making additional progress on the ring buffer 138, 300. Then, the method continues with accessing a slot(s) in a ring buffer (block 630). For example, responsive to acquiring the lock 420, the producer processor 128 may access a respective slot (e.g., slot 210A) in the ring buffer 138, 300.

The method also includes detecting a failure to produce the new memory entry (or entries) to the slot(s) in a ring buffer (block 640). For example, the producer processor 128 may detect a failure to produce the at least one new memory entry (e.g., P_7) to the respective slot (e.g., slot 210A) in a ring buffer 138, 300. In an example, the ring buffer 138, 300 has multiple slots (e.g., slots 210A-F) and each memory entry (e.g., entry pointer for packets P_1 to P_6) in the ring buffer 138, 300 has an entry structure to maintain a list of extra entries (e.g., list 320).

Then, the method includes determining a location of an entry pointer for a last produced memory entry in the ring buffer (block 650). For example, the producer processor 128 may determine a location (e.g., slot 210F) of an entry pointer (e.g., entry pointer for packet P_6) for a last produced memory entry (e.g., P_6) in the ring buffer 138, 300. Additionally, the method includes adding the new memory entry (or entries) to a list of extra entries in the slot associated with the last produced memory entry in the ring buffer (block 660). For example, the producer processor 128 may add the at least one new memory entry (e.g., P_7) to the list of extra entries (e.g., list 320) in the respective slot (e.g., slot 210F) associated with the last produced memory entry in the ring buffer 138, 300. The method also includes releasing the lock (block 670). For example, the producer processor 128 may release the lock 420. In an example, the producer processor 128 may release the lock 420 after adding the memory entry (e.g., P_7) to the list of extra entries (e.g., list 320). In another example, the producer processor 128 may hold the lock 420 until another slot (e.g., slot 210A) in the ring buffer 138, 300 becomes available.

Figure 7A:
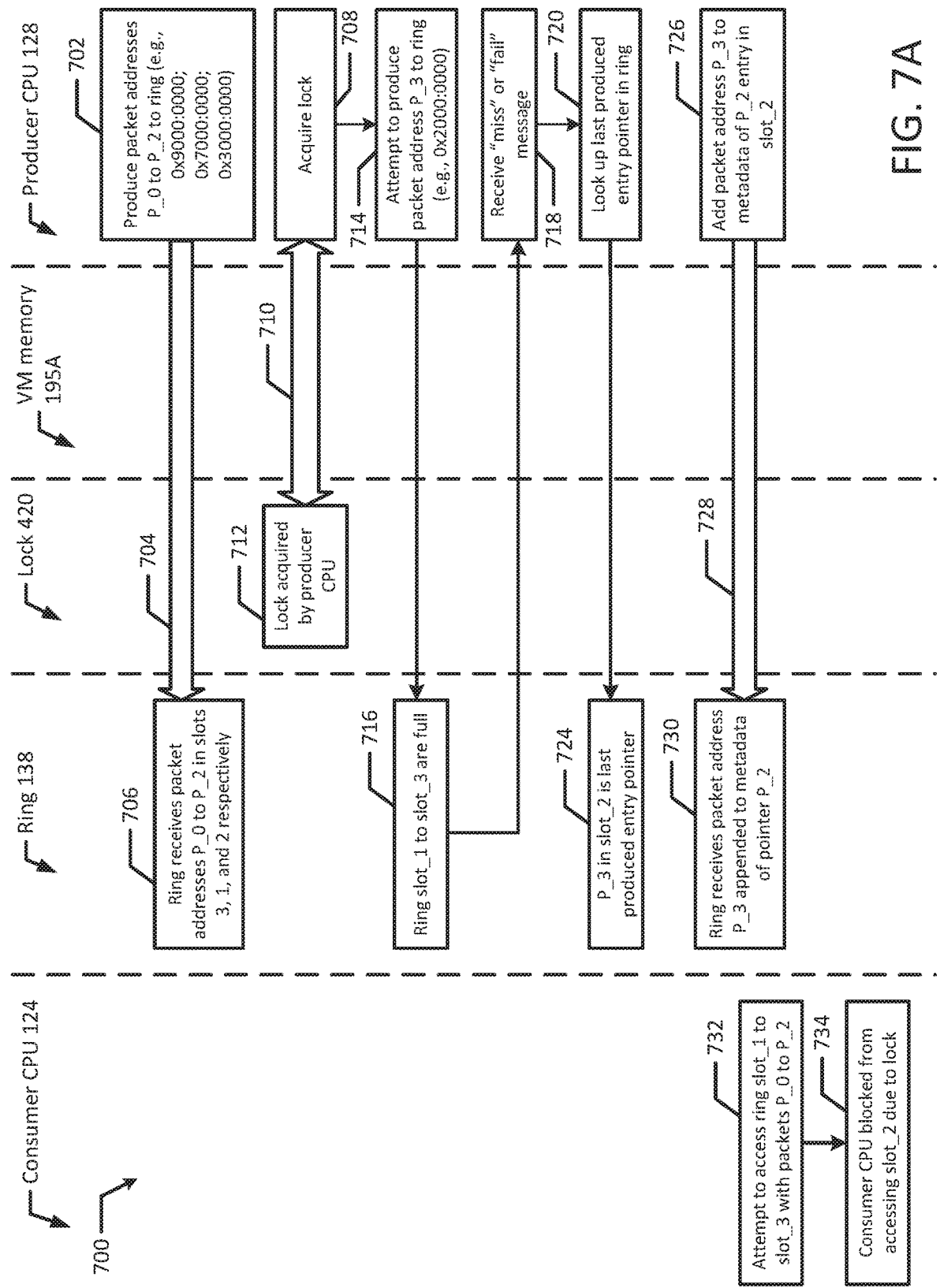
Figure 7B:
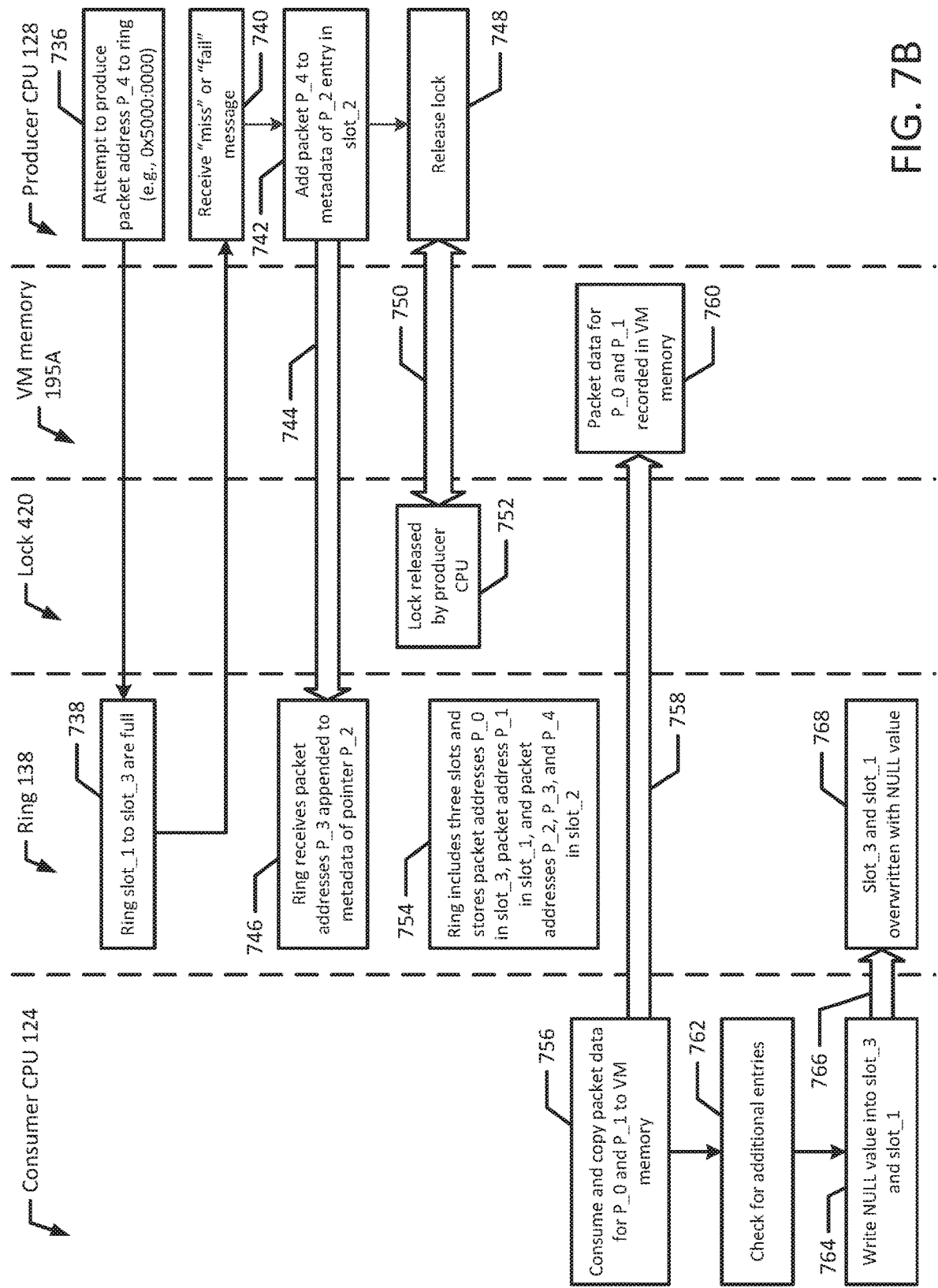

FIGS. 7A, 7B and 7C illustrate a flowchart of an example method 700 for memory cache pressure reduction for pointer rings in accordance with an example embodiment of the present disclosure. Although the example method 700 is described with reference to the flowchart illustrated in FIGS. 7A, 7B and 7C, it will be appreciated that many other methods of performing the acts associated with the method 700 may be used. For example, the order of some of the blocks may be changed, certain blocks may be combined with other blocks, and some of the blocks described are optional. For example, a consumer processor 124 (e.g., consumer CPU) and a producer processor 128 (e.g., producer CPU) may communicate with a ring buffer 138 and virtual machine memory 195A to perform example method 700. The consumer processor 124 and producer processor 128 in FIGS. 7A, 7B and 7C may be hyper-threading on the same CPU core.

In the illustrated example, the producer CPU 128 may produce packet addresses P_0 to P_2 to ring buffer 138

(blocks 702 and 704). For example, the producer CPU may produce packet addresses 0.x9000:0000, 0x7000:0000, and 0x3000:0000 corresponding to packet address P_0 to P_2 in three slots in the ring buffer 138 (e.g., third slot, first slot, and second slot). Then, the ring buffer or ring 138 receives packet addresses P_0 to P_2 (block 706). For example, packet addresses P_0 to P_2 may be written in the ring 138. In an example, packet addresses P_0 to P_2 may be stored in the ring 138 by writing the packet address into the slot (e.g., replacing NULL value with a pointer value such as a packet address). In the illustrated example, the ring 138 includes three slots and stores packet addresses P_0 to P_2 in slot_3, slot_1, and slot_2.

Then, the producer CPU 128 acquires a lock (blocks 708 to 712). For example, the producer CPU 128 may acquire the lock 420 prior to accessing a slot or entry in the ring buffer 138. The lock 420 may be a local lock (e.g., a lock for a specific slot, entry pointer, or metadata) or a global lock (e.g., a lock for an entire ring buffer 138 or that locks out all consumer CPU 124). After acquiring the lock 420, the producer CPU 128 attempts to produce packet address P_3 to the ring buffer 138 (block 714). For example, the producer CPU 128 may attempt to add packet P_3 to a slot in the ring buffer 138. However, ring slots (e.g., slot_1 to slot_3) are full (block 716). For example, the ring slots are occupied by other entry pointers, such as packet addresses of previously produced packets. In an example, ring slots may also be full if the consumer CPU 124 has copied but not yet invalidated the slots. Then, the producer CPU 128 receives a "miss" or "fail" message (block 718). For example, the producer CPU 128 may fail to add a packet entry to the ring buffer 138 normally if the ring buffer 138 is full.

After failing to add the packet entry normally, the producer CPU 128 looks up the last produced entry pointer in the ring buffer 138 (block 720). The producer CPU 128 may look up the last produced entry from a list it maintains. Additionally, the producer CPU 128 may walk the ring buffer 138 to determine which entry pointer is the last produced entry pointer in the ring buffer 138. In the illustrated example, P_3 in slot_2 is the last produced entry pointer in the ring buffer 138 (block 724).

The producer CPU 128 adds packet address P_3 to metadata of the P_2 entry in slot_2 (blocks 726 and 728). The entry pointer for P_2 may have a data structure that includes the packet address (e.g., P_2) as well as some metadata that has space to store a list of extra entries (e.g., information related to packet address P_3). The data structure may be capable of storing multiple entries in the list of extra entries, for example, ten memory entries may be stored in the list of extra entries. The ring buffer 138 receives the packet address P_3 appended to metadata of pointer P_2 (block 730). In an example, the packet address P_3 may be appended to or stored in the metadata as a linked list. Existing space in the data structure may be used for the linked list. In another example, the data structure may be augmented or extended to include additional space for the list of extra entries.

The consumer CPU 124 attempts to access ring slot_1 to slot_3 with packets P_0 to P_2 (block 732). For example, the consumer CPU 124 may have completed an earlier task and is checking the ring buffer 138 for additional packets to consume. However, the consumer CPU 124 is blocked from accessing slot_2 due to the lock 420 (block 734). For example, lock 420 may lock a specific slot or entry pointer thereby preventing the consumer CPU 124 from accessing the slot while the producer CPU 128 is in the process of adding extra entries. Without the lock 420, the slot (e.g., slot_2) may be inadvertently consumed while the producer CPU 128 is producing entries to the extras list, which may cause the entries to be dropped or ignored by the consumer CPU 124.

Continuing on FIG. 7B, the producer CPU 128 may attempt to produce packet address P-4 to the ring buffer 138 (block 736). For example, the producer CPU 128 may attempt to produce packet addresses 0x5000:0000 corresponding to packet address P_4 to the ring buffer. However, each of the ring slots (e.g., thirds slot, first slot, and second slot) are full (block 738). For example, the slots are occupied by previously produced memory entries that have not been consumed and/or invalidated yet. The producer CPU 128 receives a "miss" or "fail" message. (block 740). For example, the producer CPU 128 may fail to add a packet entry to the ring buffer 138 and receive an error, which may be conveyed to the producer CPU 128 as a failure message.

The producer CPU 128 has already determined the location of the entry pointer for the last produced memory entry in the ring buffer 138 and adds packet P_4 to the metadata of the P_2 entry in slot_2 (blocks 742 and 744). In an example, the producer CPU 128 may confirm the location of the entry pointer for the last produced memory entry. For example, multiple producer CPUs 128 may be producing memory entries to the same ring buffer 128. Then, the ring buffer 138 receives packet address P_3 appended to the metadata of pointer P_2 (block 746). The packet address P_3 may be appended to free space in existing metadata in the entry pointer P_2. Alternatively, the data structure may be extended or augmented to include additional free space for the list of extra entries. After adding packet P_4 to the metadata of P_2, the producer CPU 128 releases the lock 420 (blocks 748 and 750). The lock 420 is released by the producer CPU 128 (block 752) and the consumer CPU 124 and access to slot_2 are now unblocked. As discussed above, when the producer CPU 128 acquires a lock, consumer CPUs 124 may be restricted for accessing a slot (e.g. slot_2), a linked list in an entry pointer, an entire ring buffer 138, etc. At this point, the ring buffer 138 includes three slots and stores packet address P_0 in slot_3, packet address P_1 in slot_1, and packet address, P_2, P_3, and P_4 in slot_2 (block 754). An entry pointer for packet P_2 is stored in slot_2 and packet information for P_3 and P_4 are appended to metadata in the entry pointer data structure for packet P_2.

The consumer CPU 124 consumes and copies packet data for packet address P_0 and P_1 to virtual machine memory 195A (blocks 756 and 758). For example, the consumer CPU 124 may access slot_3 storing address P_0 and access slot_1 storing packet address P_1 to copy packet data at the packet addresses. Then, virtual machine memory 195A has packet data for P_0 and P_1 copied from the ring buffer 138 by the consumer CPU 124 (block 760). In an example, the memory entries may be copied to a temporary storage area before being copied to the virtual machine memory. The consumer CPU 124 also checks for additional entries in each of the respective memory entries it consumes (block 762). Neither of the memory entries include entries in their respective list of extra entries and the consumer CPU writes a NULL value into slot_3 and slot_1 (blocks 764 and 766). For example, to invalidate the slots, the CPU may write a NULL value, such as "0" into each of the slots. Now, the ring buffer 138 includes slot_3 and slot_1 overwritten with NULL values (block 768). Once the slots are invalidated or overwritten with NULL values, the producer CPU 128 may produce additional memory entries to the empty slots.

Continuing on FIG. 7C, the consumer CPU 124 consumes and copies packet data for packet address P_2 to virtual machine memory 195A (blocks 770 and 772). For example, the consumer CPU 124 may access slot_2 storing address P_2 to copy packet data at the packet address. Then, virtual machine memory 195A has packet data for P_2 copied from the ring buffer 138 by the consumer CPU 124 (block 774). The consumer CPU 124 also checks for additional entries in the entry pointer associated with packet address P_2 (block 776). For example, the consumer CPU 124 may scan the metadata associated with the entry pointer for P_2. While scanning the metadata, the consumer CPU 124 may detect whether the metadata stores a list of extra entries, such as a linked list. Recall that that P_2 includes extra entries P_3 and P_4 in the entry pointer metadata for packet P_2 (block 778). Then, the consumer CPU 124 copies the additional entries P_3 and P_4 to a consumer list (block 780). For example, the consumer list may be stored in memory available to consumer CPU 124. After copying the additional entries, the consumer CPU 124 writes a NULL value into slot_2 (blocks 782 and 784). For example, to invalidate slot_2, the CPU may write a NULL value, such as "0" into the slot. Now, the ring buffer 138 includes slot_2 overwritten with a NULL value (block 786). The invalidated slots are considered empty and can be used by the producer CPU 128 to produce data packets associated with future network traffic. The consumer CPU 124 copies packet data for P_3 and P_4 to virtual machine memory 195A (blocks 788 and 790). Then, virtual machine memory 195A has packet data for P_3 and P_4 copied from the ring buffer 138 by the consumer CPU 124 (block 792).

As illustrated in FIG. 7C, the producer CPU 128 may receive additional packets. For example, producer CPU 128 may receive and produce packet address P_5 to the ring buffer 138 (blocks 794 and 796). For example, the producer CPU may produce packet addresses 0.x1000:0000 corresponding to packet address P_5 to slot_3 in the ring buffer 138. Then the ring buffer 138 receives packet address P_5 in slot_3 (block 798). The packet address for P_5 may be stored in slot_3 by an entry pointer with an augmented data structure that allows additional memory entries to be stored in a list of extra entries, which advantageously allows the ring buffer 138 to accommodate periods of increased network traffic.

Figure 8:
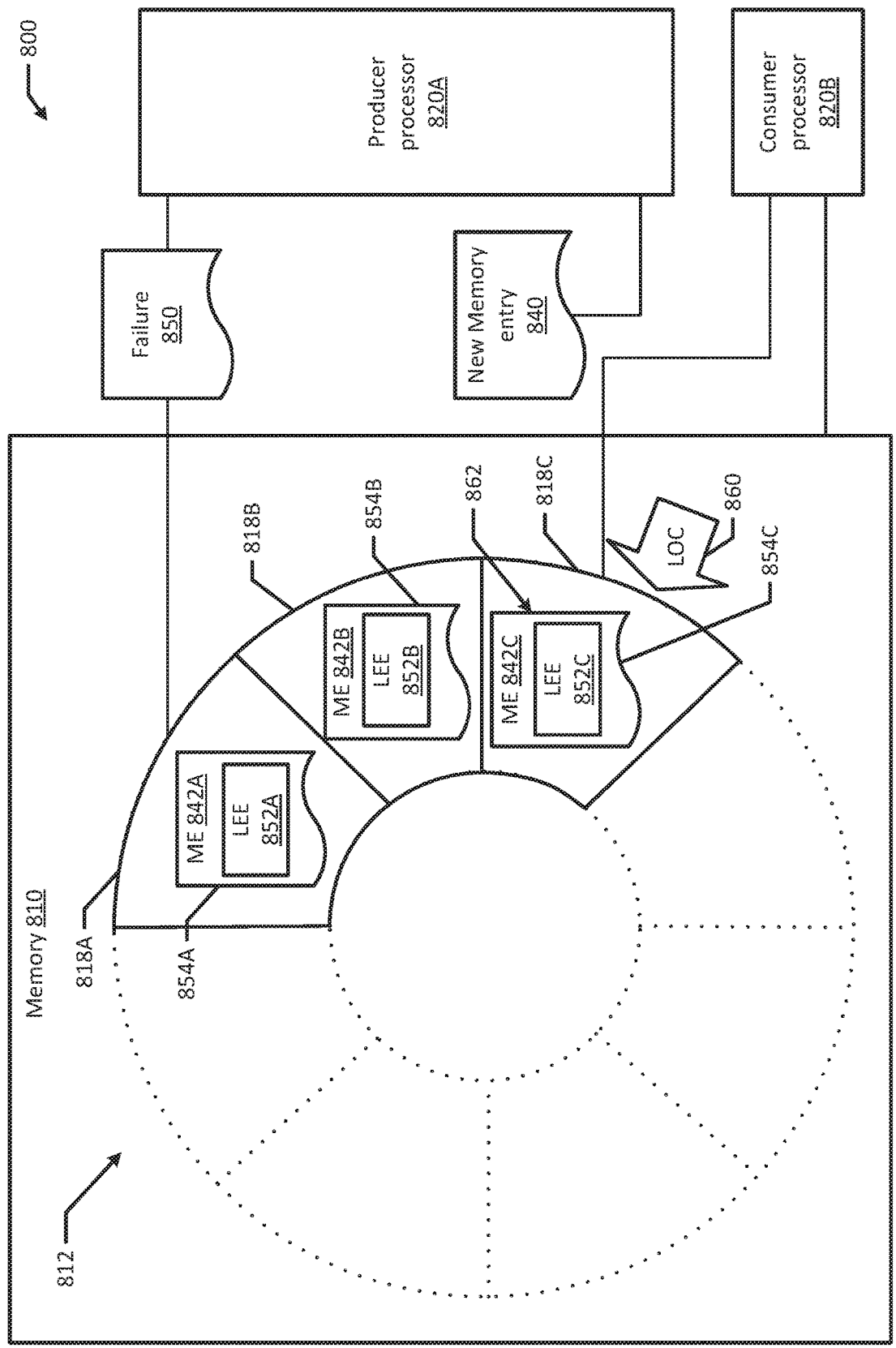
FIG. 8 illustrates a block diagram of an example memory cache pressure reduction system according to an example embodiment of the present disclosure.

FIG. 8 is a block diagram of an example memory cache pressure reduction system 800 according to an example embodiment of the present disclosure. System 800 includes a memory 810 and a producer processor 820A and a consumer processor 820B in communication with the memory 810. The memory 810 includes a ring buffer 812 having a plurality of slots 818A-C. The producer processor 820A is configured to receive a new memory entry 840 and detect a failure 850 to produce the new memory 840 entry to a slot in the ring buffer 812. Each memory entry 842A-C in the ring buffer 812 has an entry structure 854 (e.g., structures 854A-C) to maintain a list of extra entries (LEE) 852A-C. The producer processor 820A is also configured to determine a location 860 of an entry pointer 862 for a last produced memory entry (e.g., ME 842C) in the ring buffer 812 and add the new memory entry 840 to the list of extra entries (e.g., LEE 852C) in the respective slot 818C associated with the last produced memory entry (e.g., ME 842C) in the ring buffer 812. Responsive to consuming the last produced memory entry, the consumer processor 820B is configured to check whether the last produced memory entry (e.g., ME 842C) includes any other memory entries (e.g., new memory entry 840) in the list of extra entries (e.g., LEE 852C). Additionally, the consumer processor 820B is configured to consume the new memory entry 840.

During periods of heavy network traffic, the ring buffer 812 can handle the influx of packets or memory entries even if the ring buffer 812 is full. The new packets may be added to lists of extra entries (e.g., 852A-C) in respective entry pointers (e.g., entry pointer 862) in the ring buffer 812 where they can later be consumed by consumer processor 820B. The network traffic can be accommodated without resizing the ring buffer 812, which advantageously allows the system to use a less computationally expensive memory ring buffer 812 that places less pressure on cache while avoiding dropped packets when the ring buffer 812 is full, thereby improving performance and throughput without doubling the ring size.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system includes a memory and at least one processor in communication with the memory. The memory includes a ring buffer having a plurality of slots. The at least on processor includes a producer processor and a consumer processor. The producer processor is configured to receive a new memory entry and detect a failure to produce the new memory entry to a slot in the ring buffer. Each memory entry in the ring buffer has an entry structure to maintain a list of extra entries. The producer processor is also configured to determine a location of an entry pointer for a last produced memory entry in the ring buffer and add the new memory entry to the list of extra entries in the respective slot associated with the last produced memory entry in the ring buffer. Responsive to consuming the last produced memory entry, the consumer processor is configured to check whether the last produced memory entry includes any other memory entries in the list of extra entries. Additionally, the consumer processor is configured to consume the new memory entry.

In accordance with a 2nd exemplary aspect of the present disclosure, which may be used in combination with any one or more of the preceding aspects (e.g., the 1st aspect), the memory is a first memory, and consuming the new memory entry includes copying the new memory entry to a second memory.

In accordance with a 3rd exemplary aspect of the present disclosure, which may be used in combination with any one or more of the preceding aspects (e.g., the 2nd aspect), the second memory is a virtual machine memory.

In accordance with a 4th exemplary aspect of the present disclosure, which may be used in combination with any one or more of the preceding aspects (e.g., the 1st aspect), the consumer processor is further configured to copy the new memory entry from the list of extra entries prior to consuming the new memory entry.

In accordance with a 5th exemplary aspect of the present disclosure, which may be used in combination with any one or more of the preceding aspects (e.g., the 1st aspect), the consumer processor is configured to preserve an order of memory entries as received by the producer processor.

In accordance with a 6th exemplary aspect of the present disclosure, which may be used in combination with any one or more of the preceding aspects (e.g., the 5th aspect), the consumer processor is configured to consume the new memory entry prior to consuming another respective memory entry in order to preserve the order of memory entries as received by the producer processor.

In accordance with a 7th exemplary aspect of the present disclosure, which may be used in combination with any one or more of the preceding aspects (e.g., the 1st aspect), the list of extra entries is a linked list.

In accordance with an 8th exemplary aspect of the present disclosure, which may be used in combination with any one or more of the preceding aspects (e.g., the 1st aspect), the entry structure includes a memory address and metadata, and wherein the list of extra entries is stored in the metadata.

In accordance with a 9th exemplary aspect of the present disclosure, which may be used in combination with any one or more of the preceding aspects (e.g., the 1st aspect), the new memory entry is a first memory entry. Additionally, the producer processor is configured to receive a second memory entry, detect a failure to produce the second memory entry to a respective slot in the ring buffer, determine the location of the entry pointer for the last produced memory entry in the ring buffer, and add the second memory entry to the list of extra entries in the respective slot associated with the last produced memory entry in the ring buffer.

In accordance with a 10th exemplary aspect of the present disclosure, which may be used in combination with any one or more of the preceding aspects (e.g., the 9th aspect), responsive to consuming the first memory entry, the consumer processor is configured to consume the second memory entry.

In accordance with an 11th exemplary aspect of the present disclosure, which may be used in combination with any one or more of the preceding aspects (e.g., the 1st aspect), the location of the entry pointer is a slot location.

In accordance with a 12th exemplary aspect of the present disclosure, which may be used in combination with any one or more of the preceding aspects (e.g., the 1st aspect), prior to adding the new memory entry to the list of extra entries in the respective slot associated with the last produced memory entry, the producer processor is configured to acquire a lock associated with the location of the entry pointer for the last produced memory entry.

In accordance with a 13th exemplary aspect of the present disclosure, which may be used in combination with any one or more of the preceding aspects (e.g., the 12th aspect), the producer processor is configured to release the lock after adding the new memory entry to the list of extra entries.

In accordance with a 14th exemplary aspect of the present disclosure, which may be used in combination with any one or more of the preceding aspects (e.g., the 12th aspect), the lock restricts the consumer processor from accessing the respective slot associated with the last produced memory entry in the ring buffer.

Aspects of the subject matter described herein may be useful alone or in combination with one or more other aspects described herein. In a 15th exemplary aspect of the present disclosure, a method includes receiving, by a producer processor, a new memory entry and detecting a failure to produce the new memory entry to a slot in a ring buffer. Each memory entry in the ring buffer has an entry structure to maintain a list of extra entries. The method also includes determining, by the producer processor, a location of an entry pointer for a last produced memory entry in the ring buffer and adding the new memory entry to the list of extra entries in the respective slot associated with the last produced memory entry in the ring buffer. Additionally, the method includes responsive to consuming the last produced memory entry, checking, by a consumer processor, whether the last produced memory entry includes any other memory entries in the list of extra entries and consuming the new memory entry.

In accordance with a 16th exemplary aspect of the present disclosure, which may be used in combination with any one or more of the preceding aspects (e.g., the 15th aspect), the method further includes copying, by the consumer processor, the new memory entry from the list of extra entries prior to consuming the new memory entry.

In accordance with a 17th exemplary aspect of the present disclosure, which may be used in combination with any one or more of the preceding aspects (e.g., the 15th aspect), the consumer processor consumes the new memory entry prior to consuming another respective memory entry in a different slot to preserve an order of memory entries received by the producer processor.

In accordance with an 18th exemplary aspect of the present disclosure, which may be used in combination with any one or more of the preceding aspects (e.g., the 15th aspect), the list of extra entries is a linked list.

In accordance with a 19th exemplary aspect of the present disclosure, which may be used in combination with any one or more of the preceding aspects (e.g., the 15th aspect), the entry structure includes a memory address and metadata, and the list of extra entries is stored in the metadata.

In accordance with a 20th exemplary aspect of the present disclosure, which may be used in combination with any one or more of the preceding aspects (e.g., the 15th aspect), the method further included receiving, by the producer processor, a second memory entry. The new memory entry is a first memory entry. The method also includes detecting, by the producer processor, a second failure to produce the second memory entry to a slot in the ring buffer. The failure to produce the first memory entry is a first failure. Additionally, the method includes determining, by the producer processor, the location of an entry pointer for the last produced memory entry in the ring buffer, and adding the second memory entry to the list of extra entries in the respective slot associated with the last produced memory entry in the ring buffer.

In accordance with a 21st exemplary aspect of the present disclosure, which may be used in combination with any one or more of the preceding aspects (e.g., the 20th aspect), the method further includes responsive to consuming the first memory entry, consuming, by the consumer processor, the second memory entry.

In accordance with a 22nd exemplary aspect of the present disclosure, which may be used in combination with any one or more of the preceding aspects (e.g., the 15th aspect), the location of the entry pointer is a slot location.

In accordance with a 23rd exemplary aspect of the present disclosure, which may be used in combination with any one or more of the preceding aspects (e.g., the 15th aspect), the method further includes prior to adding the new memory entry to the list of extra entries in the respective slot associated with the last produced memory entry in the ring buffer, acquiring, by the producer processor, a lock associated with the location of the entry pointer for the last produced memory entry in the ring buffer.

In accordance with a 24th exemplary aspect of the present disclosure, which may be used in combination with any one or more of the preceding aspects (e.g., the 23rd aspect), the method further includes releasing, by the producer processor, the lock after adding the new memory entry to the list of extra entries.

In accordance with a 25th exemplary aspect of the present disclosure, which may be used in combination with any one or more of the preceding aspects (e.g., the 23rd aspect), the lock restricts the consumer processor from accessing the respective slot associated with the last produced memory entry in the ring buffer.

Aspects of the subject matter described herein may be useful alone or in combination with one or more other aspects described herein. In a 26th exemplary aspect of the present disclosure, a non-transitory machine-readable medium stores code, which when executed by a producer processor and a consumer processor, is configured to receive, by the producer processor, a new memory entry and detect a failure to produce the new memory entry to a slot in a ring buffer. Each memory entry in the ring buffer has an entry structure to maintain a list of extra entries. The producer processor is also configured to determine a location of an entry pointer for a last produced memory entry in the ring buffer and add the new memory entry to the list of extra entries in the respective slot associated with the last produced memory entry in the ring buffer. Responsive to consuming the last produced memory entry, the consumer processor is configured to check whether the last produced memory entry includes any other memory entries in the list of extra entries. Additionally, the consumer processor is configured to consume the new memory entry.

Aspects of the subject matter described herein may be useful alone or in combination with one or more other aspects described herein. In a 27th exemplary aspect of the present disclosure, a system includes a means for receiving a new memory entry and a means for detecting a failure to produce the new memory entry to a slot in a ring buffer. Each memory entry in the ring buffer has an entry structure to maintain a list of extra entries. The system also includes a means for determining a location of an entry pointer for a last produced memory entry in the ring buffer, a means for adding the new memory entry to the list of extra entries in the respective slot associated with the last produced memory entry in the ring buffer, a means for checking whether the last produced memory entry includes any other memory entries in the list of extra entries in response to consuming the last produced memory entry, and a means for consuming the new memory entry.

Aspects of the subject matter described herein may be useful alone or in combination with one or more other aspects described herein. In a 28th exemplary aspect of the present disclosure, a system includes a memory and at least one processor in communication with the memory. The memory includes a ring buffer having a plurality of slots. The at least on processor includes a producer processor that is configured to receive at least one new memory entry, acquire a lock, and responsive to acquiring the lock, access a slot in the ring buffer. The producer processor is also configured to detect a failure to produce the at least one new memory entry to the slot in the ring buffer. Each memory entry in the ring buffer has an entry structure to maintain a list of extra entries. Additionally, the producer processor is configured to determine a location of an entry pointer for a last produced memory entry in the ring buffer, add the at least one new memory entry to the list of extra entries in the respective slot associated with the last produced memory entry in the ring buffer, and release the lock.

In accordance with a 29th exemplary aspect of the present disclosure, which may be used in combination with any one or more of the preceding aspects (e.g., the 28th aspect), the lock is a global lock.

In accordance with a 30th exemplary aspect of the present disclosure, which may be used in combination with any one or more of the preceding aspects (e.g., the 28th aspect), the lock is a local lock associated with the location of the entry pointer for the last produced memory entry.

In accordance with a 31st exemplary aspect of the present disclosure, which may be used in combination with any one or more of the preceding aspects (e.g., the 28th aspect), the at least on processor includes a consumer processor and the consumer processor is configured to responsive to consuming the last produced memory entry, check whether the last produced memory entry includes any other memory entries in the list of extra entries, and consume the at least one new memory entry.

In accordance with a 32nd exemplary aspect of the present disclosure, which may be used in combination with any one or more of the preceding aspects (e.g., the 21st aspect), the consumer processor is further configured to acquire the lock prior to consuming the at least one memory entry.

In accordance with a 33rd exemplary aspect of the present disclosure, which may be used in combination with any one or more of the preceding aspects (e.g., the 28th aspect), the list of extra entries is a linked list.

In accordance with a 34th exemplary aspect of the present disclosure, which may be used in combination with any one or more of the preceding aspects (e.g., the 28th aspect), the entry structure includes a memory address and metadata, and wherein the list of extra entries is stored in the metadata.

Aspects of the subject matter described herein may be useful alone or in combination with one or more other aspects described herein. In a 35th exemplary aspect of the present disclosure, a method includes receiving, by a producer processor, at least one new memory entry and acquiring a lock. Responsive to acquiring the lock, the producer processor accesses a respective slot in a ring buffer. The method also includes detecting, by the producer processor, a failure to produce the at least one new memory entry to the respective slot in a ring buffer having a plurality of slots. Each memory entry in the ring buffer has an entry structure to maintain a list of extra entries. The method also includes determining, by the producer processor, a location of an entry pointer for a last produced memory entry in the ring buffer and adding the at least one new memory entry to the list of extra entries in the respective slot associated with the last produced memory entry in the ring buffer. Additionally, the method includes releasing the lock.

In accordance with a 36th exemplary aspect of the present disclosure, which may be used in combination with any one or more of the preceding aspects (e.g., the 35th aspect), the method further includes responsive to consuming the last produced memory entry, checking, by a consumer processor, whether the last produced memory entry includes any other memory entries in the list of extra entries, and consuming, by the consumer processor, the at least one new memory entry.

In accordance with a 37th exemplary aspect of the present disclosure, which may be used in combination with any one or more of the preceding aspects (e.g., the 35th aspect), the lock is a global lock.

In accordance with a 38th exemplary aspect of the present disclosure, which may be used in combination with any one or more of the preceding aspects (e.g., the 35th aspect), the lock is a local lock associated with a respective entry pointer for the last produced memory entry in the ring buffer.

In accordance with a 39th exemplary aspect of the present disclosure, which may be used in combination with any one or more of the preceding aspects (e.g., the 35th aspect), the lock is configured to restrict access by the consumer processor to the entry pointer for the last produced memory entry in the ring buffer.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

The invention is claimed as follows:

1. A system comprising:
    a memory including a ring buffer having a plurality of slots; and
    at least one processor in communication with the memory, wherein the at least on processor includes a producer processor and a consumer processor, wherein the producer processor is configured to:
        receive a new memory entry,
        detect a failure to produce the new memory entry to a slot in the ring buffer, wherein each memory entry in the ring buffer has an entry structure to maintain a list of extra entries,
        determine a location of an entry pointer for a last produced memory entry in the ring buffer, and
        add the new memory entry to the list of extra entries in a respective slot associated with the last produced memory entry in the ring buffer, and
    wherein the consumer processor is configured to:
        responsive to consuming the last produced memory entry, check whether the last produced memory entry includes any other memory entries in the list of extra entries, and
        consume the new memory entry.

2. The system of claim 1, wherein the memory is a first memory, and wherein consuming the new memory entry includes copying the new memory entry to a second memory.

3. The system of claim 2, wherein the second memory is a virtual machine memory.

4. The system of claim 1, wherein the consumer processor is further configured to copy the new memory entry from the list of extra entries prior to consuming the new memory entry.

5. The system of claim 1, wherein the consumer processor is configured to preserve an order of memory entries as received by the producer processor.

6. The system of claim 5, wherein the consumer processor is configured to consume the new memory entry prior to consuming another respective memory entry in order to preserve the order of memory entries as received by the producer processor.

7. The system of claim 1, wherein the list of extra entries is a linked list.

8. The system of claim 1, wherein the entry structure includes a memory address and metadata, and wherein the list of extra entries is stored in the metadata.

9. The system of claim 1, wherein the new memory entry is a first memory entry, and the producer processor is configured to:
    receive a second memory entry,
    detect a failure to produce the second memory entry to a second respective slot in the ring buffer,
    determine the location of the entry pointer for the last produced memory entry in the ring buffer, and
    add the second memory entry to the list of extra entries in the respective slot associated with the last produced memory entry in the ring buffer.

10. The system of claim 9, wherein the consumer processor is configured to:
    responsive to consuming the first memory entry, consume the second memory entry.

11. The system of claim 1, wherein the location of the entry pointer is a slot location.

12. The system of claim 1, wherein prior to adding the new memory entry to the list of extra entries in the respective slot associated with the last produced memory entry, the producer processor is configured to acquire a lock associated with the location of the entry pointer for the last produced memory entry.

13. The system of claim 12, wherein the producer processor is configured to release the lock after adding the new memory entry to the list of extra entries.

14. The system of claim 12, wherein the lock restricts the consumer processor from accessing the respective slot associated with the last produced memory entry in the ring buffer.

15. A method comprising:
    receiving, by a producer processor, a new memory entry;
    detecting, by the producer processor, a failure to produce the new memory entry to a slot in a ring buffer, wherein each memory entry in the ring buffer has an entry structure to maintain a list of extra entries;
    determining, by the producer processor, a location of an entry pointer for a last produced memory entry in the ring buffer;
    adding, by the producer processor, the new memory entry to the list of extra entries in a respective slot associated with the last produced memory entry in the ring buffer;
    responsive to consuming the last produced memory entry, checking, by a consumer processor, whether the last produced memory entry includes any other memory entries in the list of extra entries; and
    consuming, by the consumer processor, the new memory entry.

16. The method of claim 15, further comprising:
    copying, by the consumer processor, the new memory entry from the list of extra entries prior to consuming the new memory entry.

17. The method of claim 15, further comprising:
    receiving, by the producer processor, a second memory entry, wherein the new memory entry is a first memory entry;
    detecting, by the producer processor, a second failure to produce the second memory entry to a second respective slot in the ring buffer, wherein the failure to produce the first memory entry is a first failure;
    determining, by the producer processor, the location of an entry pointer for the last produced memory entry in the ring buffer; and adding, by the producer processor, the second memory entry to the list of extra entries in the respective slot associated with the last produced memory entry in the ring buffer.

18. A method comprising:

receiving, by a producer processor, at least one new memory entry;

acquiring, by the producer processor, a lock;

responsive to acquiring the lock, accessing, by the producer processor a respective slot in a ring buffer;

detecting, by the producer processor, a failure to produce the at least one new memory entry to the respective slot in a ring buffer having a plurality of slots, wherein each memory entry in the ring buffer has an entry structure to maintain a list of extra entries;

determining, by the producer processor, a location of an entry pointer for a last produced memory entry in the ring buffer;

adding, by the producer processor, the at least one new memory entry to the list of extra entries in a second respective slot associated with the last produced memory entry in the ring buffer; and releasing, by the producer processor, the lock.

19. The method of claim 18, further comprising:

responsive to consuming the last produced memory entry, checking, by a consumer processor, whether the last produced memory entry includes any other memory entries in the list of extra entries, and consuming, by the consumer processor, the at least one new memory entry.

20. The method of claim 18, wherein the lock is a local lock associated with a respective entry pointer for the last produced memory entry in the ring buffer.

* * * * *